United States Patent [19]
Merritt

[11] 3,850,345
[45] Nov. 26, 1974

[54] FILLING VALVE
[75] Inventor: Robert D. Merritt, Rossville, Ill.
[73] Assignee: FMC Corporation, San Jose, Calif.
[22] Filed: Nov. 28, 1973
[21] Appl. No.: 419,735

[52] U.S. Cl............... 222/168.5, 92/79, 141/146, 141/147, 141/258, 222/380
[51] Int. Cl............................................. B67d 5/34
[58] Field of Search ........ 222/168.5, 309, 366, 380; 141/146, 147, 248, 258; 92/79, 469

[56] References Cited
UNITED STATES PATENTS

| | | | |
|---|---|---|---|
| 2,600,391 | 6/1952 | Cabot | 222/168.5 |
| 3,096,914 | 7/1963 | Kerr | 222/380 |
| 3,175,738 | 3/1965 | Wyers | 222/380 |
| 3,227,325 | 1/1966 | Bates | 222/309 |
| 3,580,302 | 5/1971 | Riesenberg | 222/309 |
| 3,804,135 | 4/1974 | Waxlax | 141/146 |

Primary Examiner—Robert B. Reeves
Assistant Examiner—Thomas E. Kocovsky
Attorney, Agent, or Firm—C. E. Tripp

[57] ABSTRACT

An improved plunger type filling valve, for rotary or other types of filling machines having measuring cylinders, with provision for preventing the loss of product in excess of that required for filling a container if the filling machine is stopped in mid-cycle and a measuring cylinder is open to the container, and with provision for excluding air from the filling charge during both interrupted and normal operation. A valve plunger and a measuring cylinder are arranged side by side, above the container and laterally adjacent the supply tank, with a linear diagonal passage extending downward from the supply tank into the measuring cylinder. After each filling operation, the measuring piston forces a small excess amount of product back to the supply tank to minimize air entrapment and provide accurate filling charges during continuous operation, and also to cause accurate charges to be rapidly resumed following a mid-cycle stop. The valve body and measuring chamber form a U-shaped passage which functions, if the valve is open when the machine is stopped, in a manner similar to a manometer so that atmospheric pressure prevents the product from escaping the U-shaped passage.

9 Claims, 19 Drawing Figures

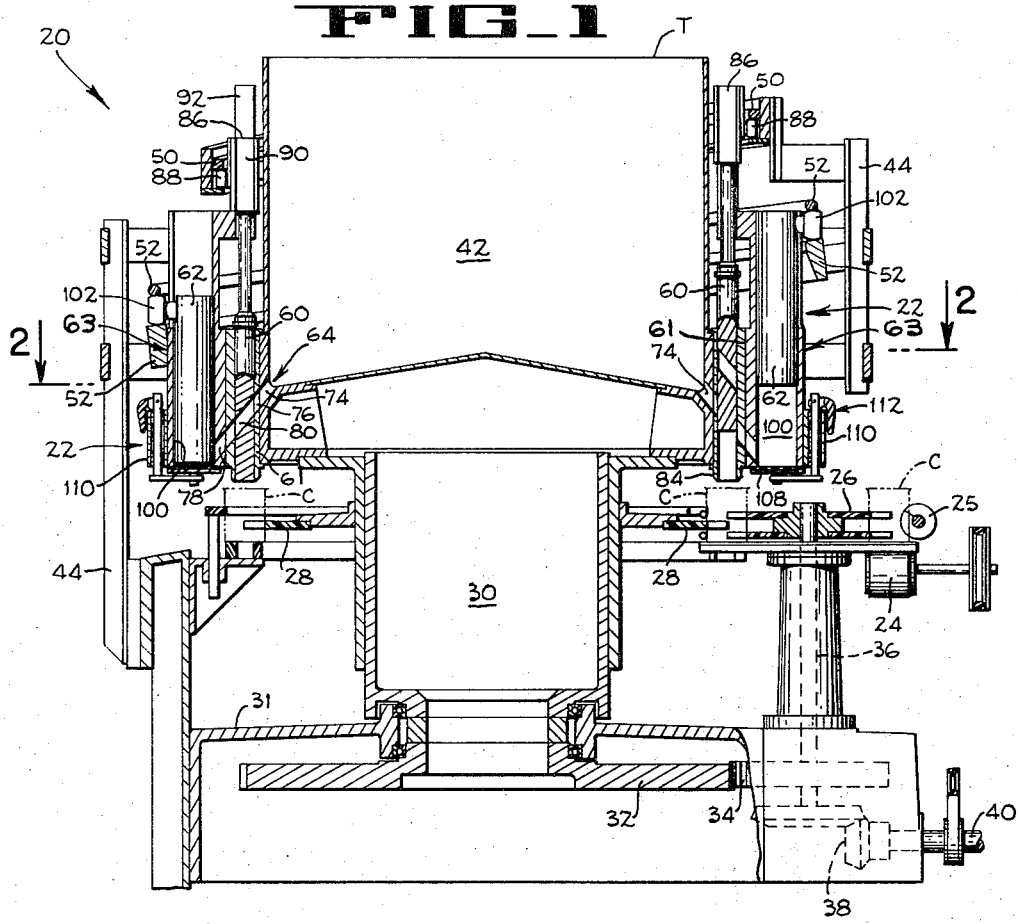
FIG_1
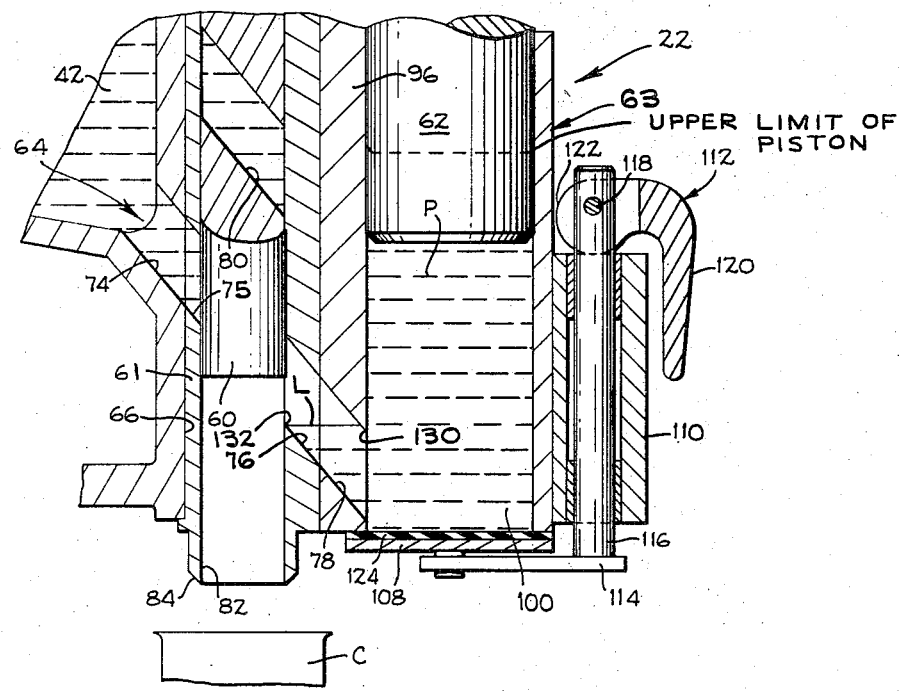
FIG_4 FILLING INTERRUPTED

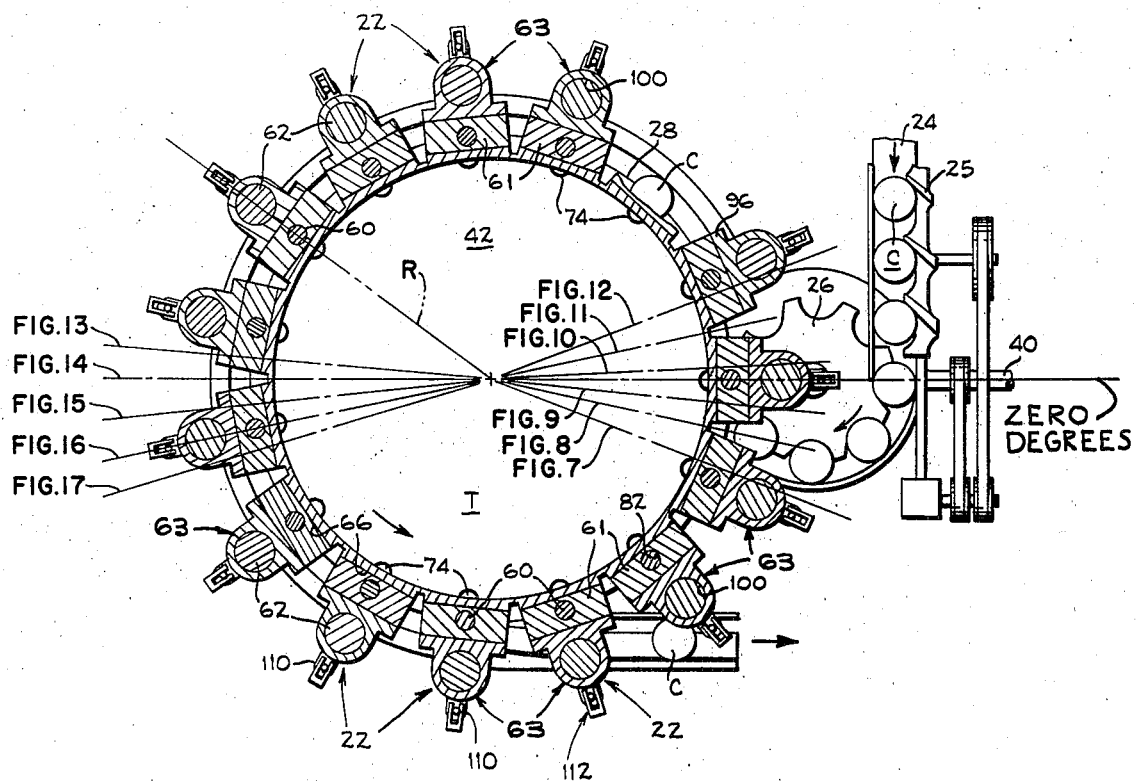
FIG_2

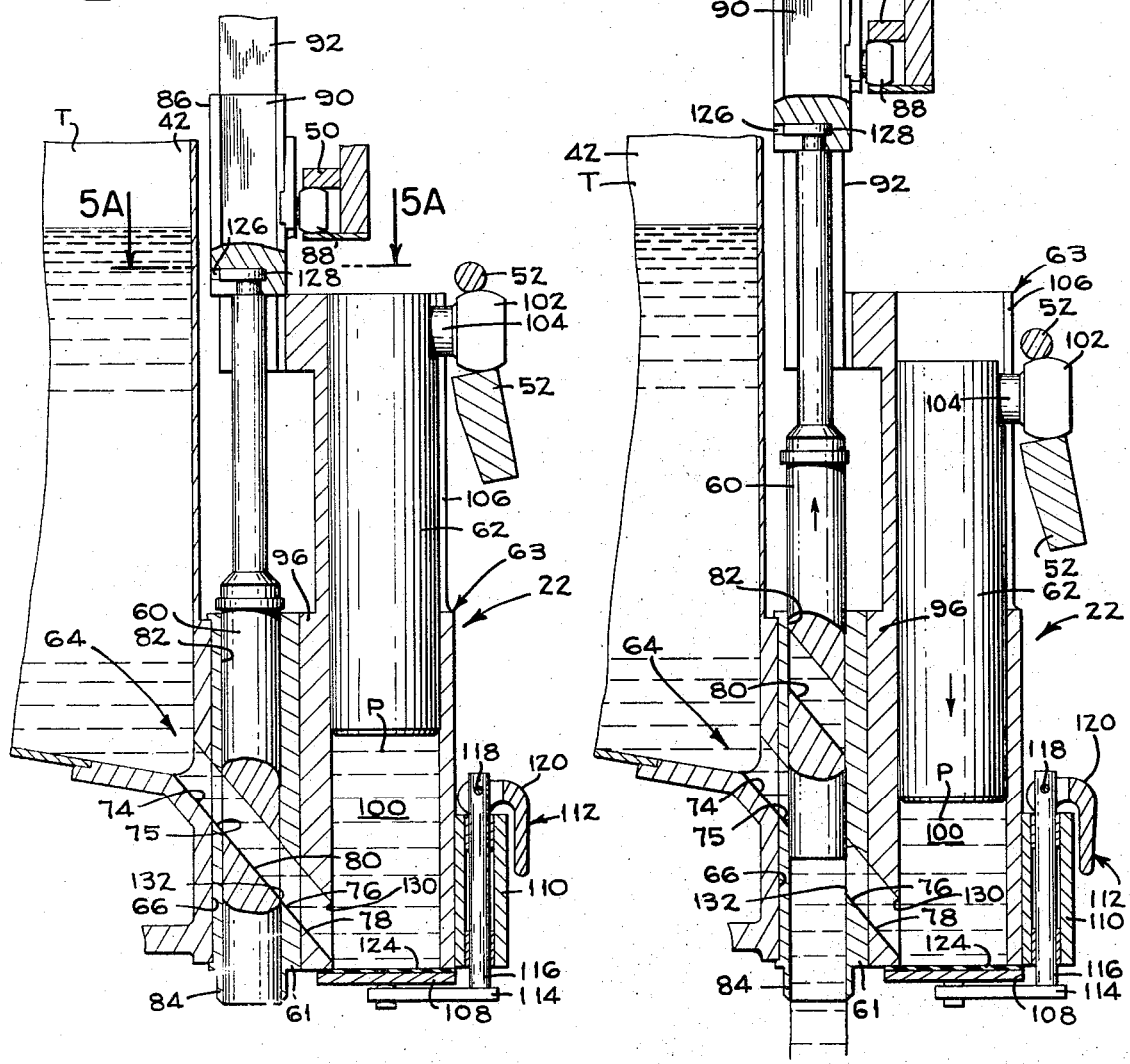
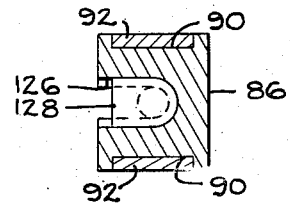

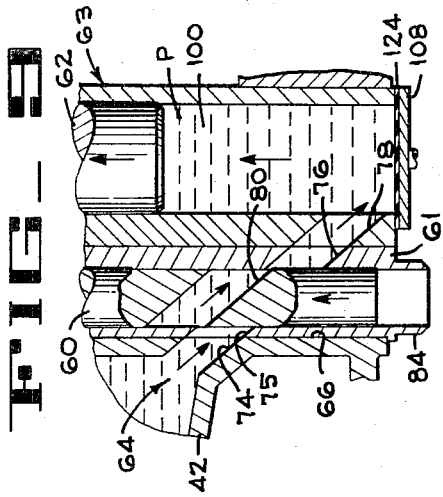
FIG_7
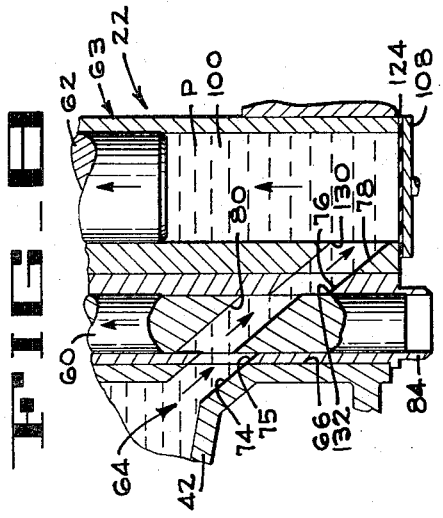
FIG_8
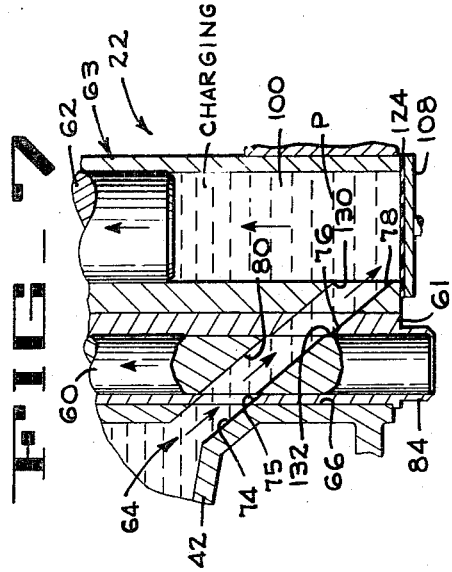
FIG_9
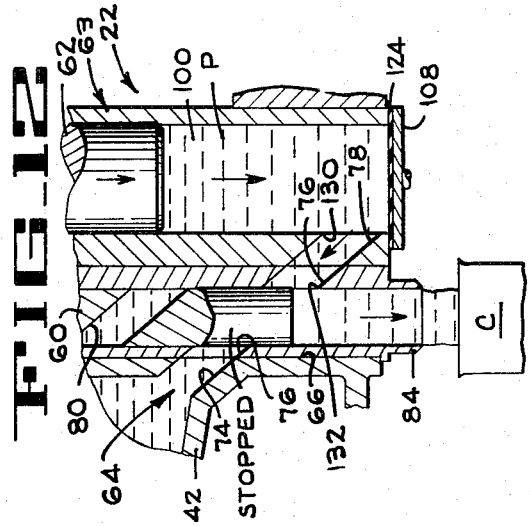
FIG_10
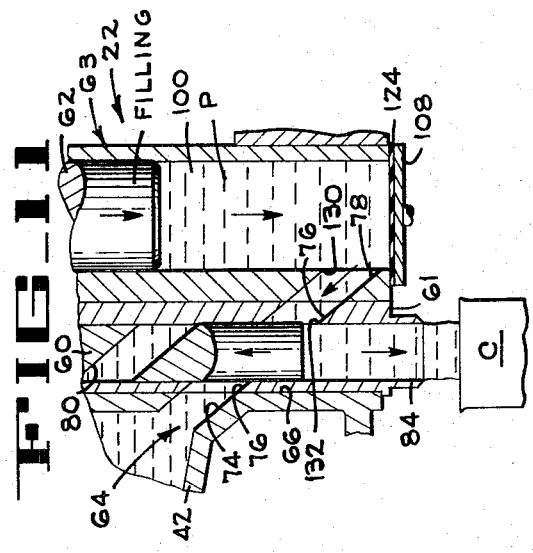
FIG_11
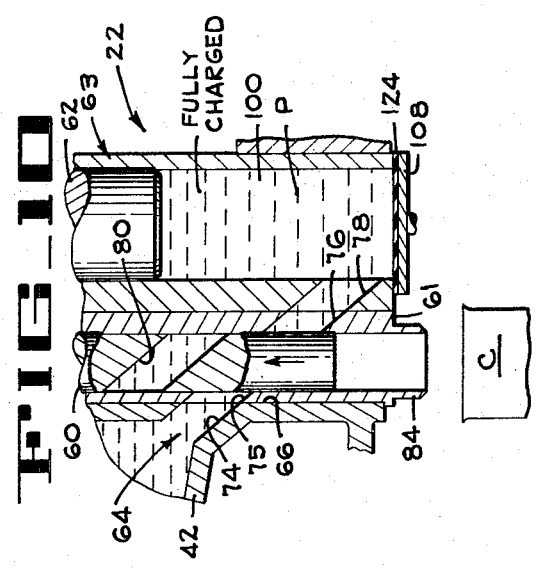
FIG_12

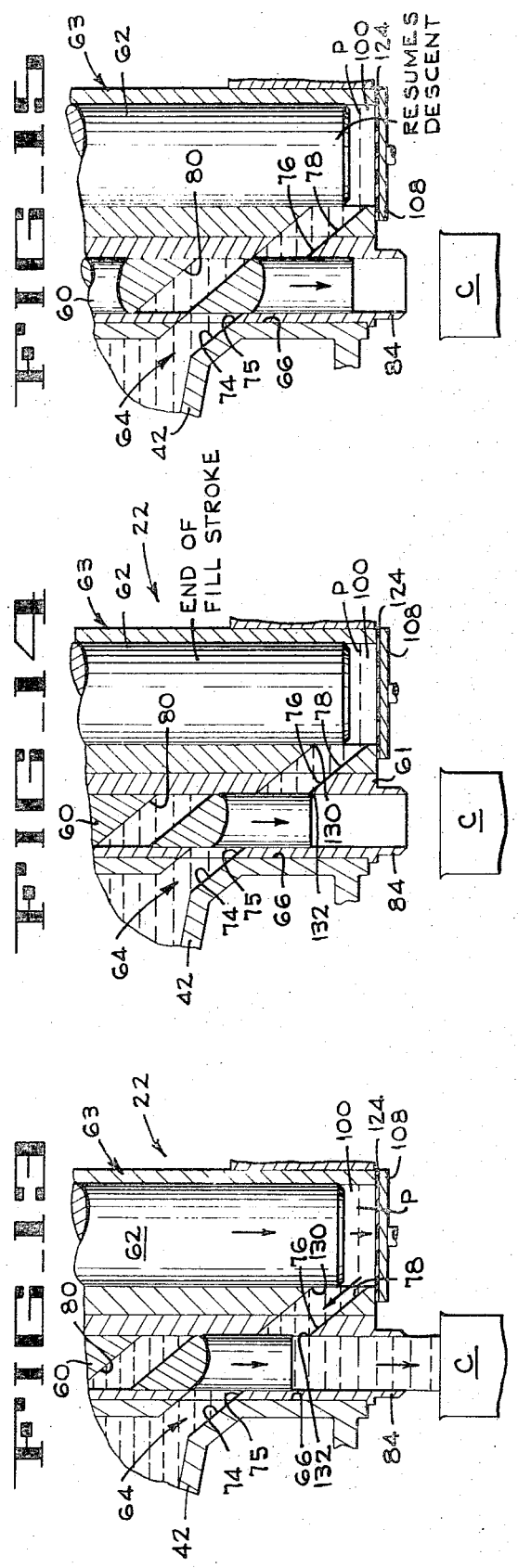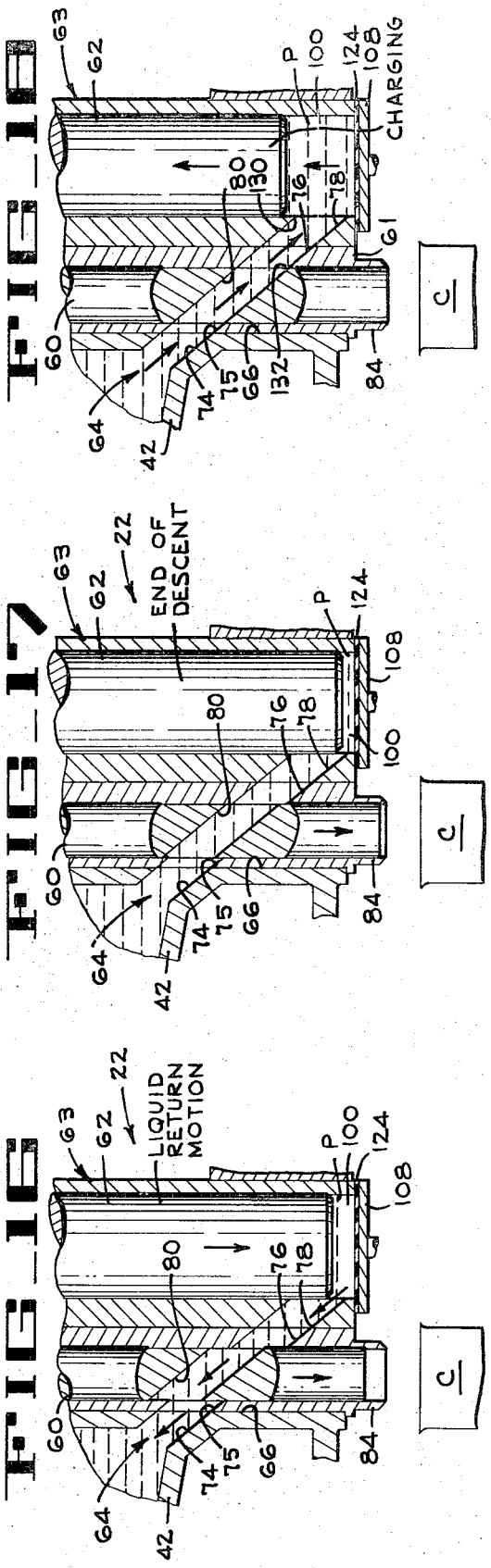

FILLING VALVE

BACKGROUND OF THE INVENTION

The field of the present invention is in filling machines, more particularly the rotary type of filling machine having plunger-type filling valves, each associated with a measuring chamber in which a measuring piston charges the chamber with a predetermined volume of liquid or semi-liquid product. Empty containers are fed onto a turret in underlying relation to the filling valves, which valves orbit with the containers. The valves are opened and closed to fill the containers in transit, by pumping the filling charges through the valves by means of the measuring pistons.

Prior art filling valves of the type above mentioned are numerous, one example of which is disclosed in the Baldwin U.S. Pat. No. 2,074,041, issued on Mar. 16, 1937. In the patented valve, and in fact with most other patented filling machine valves, it is impossible to stop the filling machine in mid-cycle without considerable loss of product from open valves. In most cases, this results in some of the containers being overfilled, and when the machine is restarted, succeeding containers are underfilled because of entrapped air in the system which will not be dissipated until several filling operations have occurred. The valves in open condition when the machine is stopped not only lose some of the product, but also entrain air in the product which must be eliminated before accorate filling resumes.

In a typical rotary filling machine, a rotating, circular product tank carries a circumferential series of filling valves. Each valve includes a variable volume measuring chamber having a movable piston. As the piston is being lifted to provide the measuring chamber with a volume of product equal to the desired container-filling charge, a port between the chamber and the supply tank is opened to admit the product to the measuring chamber. An adjacent filling nozzle includes a valve plunger which shuts off the supply of product to the measuring chamber, and then opens the nozzle at about the time the piston in the measuring chamber moves to force the product out of the measuring chamber and through the nozzle into an underlying container.

The previously noted disadvantages of prior fillers arise from the fact that the piston and the measuring chamber are necessarily physically spaced from the delivery end of the filling nozzle, and from the valve plunger which opens and closes the nozzle. This requires fluid passages, between the valve plunger block and the measuring piston cylinder, which have heretofore been arranged so that there is usually some volume of product which can gravitationally drain from these passages and through the nozzle when the filling machine is static with the measuring chamber open to the container. Because of the structural arrangements of prior overhead piston filling valves, air replaces the lost product and becomes entrained in the remaining product. This phenomenon can also occur at slow operating speeds, with filling valves that are efficient at high operating speeds, if the filling machine is slowed down to the point where the filling ports have time to drain by gravity because the measuring piston operates too slowly to pump the product out of the nozzle.

In actual production runs, it is very common to have an interruption of the filling machine for a variety of reasons, such as to remove a defective container, to clear some jam condition, because the product may be inadvertently depleted, or due to the product temperature changing from acceptable limits. When a conventional filling machine is stopped, some excess product will usually drain and result in an overfill, loss of the product, and the time and effort necessary to clean up the wasted product and remove the overfilled container or containers from the filling line. As mentioned above, this overfill condition can also occur during the filling operation, since the product flow from the ports is dependent on time, temperature and head, and at slow speeds, product can drain from the measuring cylinder ahead of the piston stroke which discharges the product.

In one rotary filling machine in present commercial use, the valving is so arranged that it is possible for the entire supply tank to drain through an open filling nozzle if the filling machine happens to stop in a particular rotative position. The valve drainage will also cause air to be entrapped within the valve or valves when the filling machine operation resumes. In aggravated cases, this air is not dissipated until the filling machine has operated for several revolutions and has discharged a relatively large number of containers. These containers, because of the entrapped air, will all be underfilled and represent a further impairment of the overall production rate.

Actual tests on one commercial filling machine, in a 16 fluid ounce fill size, demonstrated that a 75 percent overfill occurred on approximately 50 percent of the filling stations when the filling cycle was interrupted. In other words, about half of the containers had an extra 12 fluid ounces discharged into them, over and above the normal filling charge. Thus, if the normal head space could accommodate 2 fluid ounces, 10 fluid ounces of the product is spilled from each of half the total number of containers on the turret. When the filling cycle was resumed in the tested machine, several revolutions of the turret were necessary to eliminate air pockets in the filling valve mechanism, and the containers processed during the time required to remove the air from the valves were underfilled as much as 75 percent. It can be seen, therefore, that the total number of improperly filled containers, and the total wasted product, can be considerable for each instance where the normal filling operation is interrupted, and the waste will increase in proportion to the number of filling valves, and the production rate.

SUMMARY OF THE INVENTION

A valve block has an axially (vertically) movable valve core or plunger provided with a transversely diagonal bore to transfer the product downward from a supply tank to a measuring chamber. The chamber includes a cylinder having a movable measuring piston which is withdrawn, when the diagonal valve plunger bore communicates with similarly oriented passages between the supply tank and the valve block, and between the valve block and the measuring chamber, to induct a measured amount of product from the tank into the measuring chamber. The valve plunger is then shifted to establish communication between the measuring chamber and a filling nozzle in the valve block, and the product in the diagonal valve plunger bore is entrapped to preclude its discharge when the valve plunger opens the filling nozzle. The supply tank and the measuring cylinder cannot be simultaneously open to the container. This prevents air entrapment in the diagonal valve plunger bore. If the filling machine operation is interrupted when the filling nozzle is filling a container, even if the valve plunger has not yet closed the passage from the measuring chamber to the valve block, no overfill results.

As will be seen, under the present invention there is no overfill because the only product which can drain from the open valve is that which would have been part of the regular, measured filling charge. Atmospheric pressure is employed to retain the remaining or undelivered filling charge in the measuring cylinder and in the lower portion of the diagonal port connected to the cylinder. The structure defining the measuring chamber and the lower half of the diagonal port or passage between the measuring chamber and the filling nozzle functions in the manner of a closed U-tube manometer. Thus, the column of liquid in the measuring chamber is supported by atmospheric pressure reacting against the surface of the upper end of a column in the diagonal port, that surface being exposed to atmosphere through the open nozzle. When filler operation is resumed, the measuring piston displaces enough liquid from the U-tube to complete the fill.

An underfill for the next container to be filled by that valve the operation of which had been interrupted is prevented because any product that did drain from the upper portion of the diagonal port leading to the measuring chamber and into the previously filled container is replaced when the valve plunger reestablishes communication between the reservoir and the measuring chamber. At this time the void in the upper portion of the diagonal port is filled from the reservoir.

Another feature is that the diagonal bore in the valve plunger and the associated fixed diagonal ports form a passage that leads directly and upwardly from the measuring chamber to the supply tank when the valve plunger is lowered to connect these elements after completion of the fill. This facilitates the removal of any small air pockets that may possibly have formed, because the air bubbles have a direct upward path from the measuring chamber to the supply tank through the column of product in the diagonal passage. In addition, and to ensure that any air is positively removed, when the valve plunger is lowered to provide the aforesaid passage the measuring piston is lowered below the position it occupied at the end of fill in order to pump a small volume of product from the measuring chamber back to the supply tank.

The preferred construction which provides the above outlined results is one wherein the valve plunger and its measuring cylinder are mounted side by side along a substantially radial line of the turret, and one wherein as previously indicated, the measuring chamber, the filling nozzle, and their interconnecting diagonal passages can function as a closed U-tube manometer to support the column of product in the measuring chamber and prevent the loss of the product through an open nozzle if the filling machine is temporarily stopped.

BRIEF DESCRIPTION OF THE DRAWINGS

FIG. 1 is a diagrammatic vertical section of a rotary filling machine incorporating improved filling valves according to the present invention.

FIG. 2 is a diagrammatic horizontal section, partly broken away, taken along lines 2—2 on FIG. 1.

FIG. 4 is an enlarged fragmentary section of the lower portion of the FIG. 3 filling valve in assembled condition and installed on a filling machine. This figure also illustrates conditions when filling has been interrupted.

FIG. 5 is a vertical section, at reduced scale, of the FIG. 3 filling valve in assembled and installed condition.

FIG. 5A is an enlarged section taken along lines 5A—5A on FIG. 5.

FIG. 6 is a view similar to FIG. 5, but illustrating a different operational position.

FIGS. 7-18 are diagrammatic operational sections showing successive operating conditions of a filling valve during a container filling cycle, and the locations of the valve relative to the filling machine are indicated by the radial reference lines on FIG. 2.

DESCRIPTION OF THE PREFERRED EMBODIMENT

Figure 3:
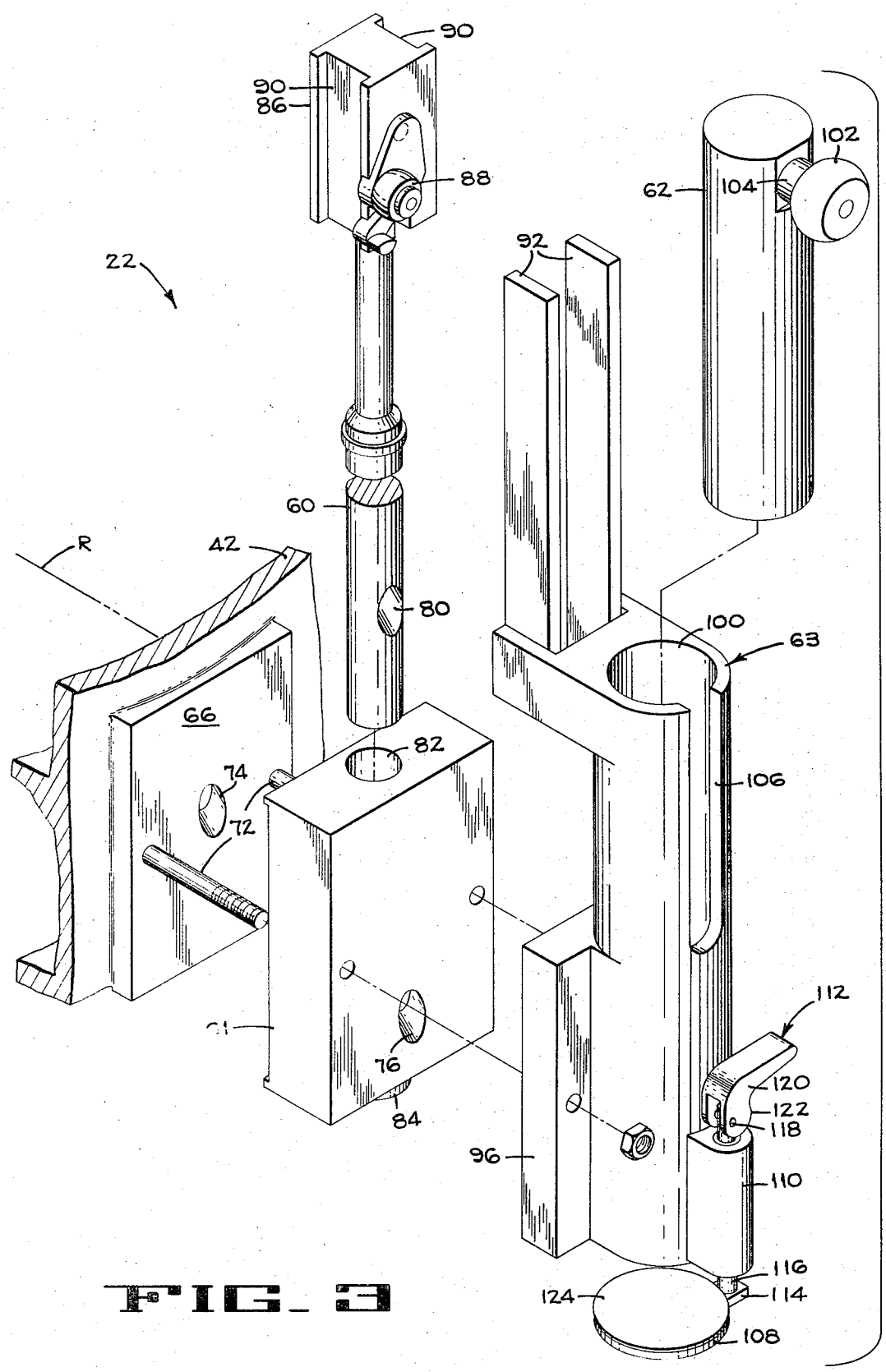
FIG. 3 is an exploded isometric of the improved filling valve.

FIG. 1 diagrammatically illustrates a rotary filling machine 20, with the improved filling valves 22 of the present invention incorporated therein. With general reference to FIGS. 1 and 2, the filling machine 20 receives an incoming lane of empty cans or similar container C from an input conveyor 24, and a driven feed screw 25 and star wheels 26 transfer the containers, one by one, into a peripheral recess or pocket of a container drive plate 28.

The drive plate 28 is part of a driven rotary turret T which includes a hollow, rotatable base 30 supported by a pedestal 31. The base 30 is rotated by a large ring gear 32 meshed with a driven gear 34 on a vertical shaft 36. Shaft 36 carries the star wheels 26 and is rotated by a bevel gear train 38 coupled to a power input shaft 40. The turret T also includes a cylindrical, open top supply tank 42 which rotates when the filling machine is in operation and carries a plurality of the spaced filling valves 22 in vertical alignment with the underlying containers C.

Fixed standards 44 support circular cam tracks which operate the moving filling valves. The uppermost of these cam tracks is a valve plunger cam 50 which, among other functions, controls the discharge of the product through each filling valve into a container. Adjacent the valve plunger cam 50 is an adjustable measuring piston cam 52 which controls the volume of the product charge admitted to each filling valve from the supply tank 42. Each cam track is constructed to provide positive, up and down motion for the elements, later mentioned, which they control.

As so far described, the filling machine 20 is similar to many prior art filling machines which have filling valves operating with vertical motion and pistonoperated measuring chambers. According to the present invention, a structural feature which is basic to the later described improved results for the filling valves 22 is a certain orientation of the components of the valves. With reference to FIGS. 2 and 3, each filling valve includes a vertically reciprocable valve plunger 60 slidable in a valve block or housing 61, and a vertically reciprocable measuring piston 62 slidable in a cylinder block or housing 63. The axes of the valve plunger 60 and the measuring piston 62 are located on a substantially radial reference line R generated from the axis of the turret T. Further, both the valve plunger 60 (FIG. 4) and the measuring piston 62 lie above the containers C. The significance of this orientation is that it allows the incorporation of a linear and inclined valve passage 64, shown at the left side of FIG. 1, collectively formed by individual passages in the valve plunger 60, the supply tank 42, and others. The valve passage 64, as will be later described, is one of the important structural provisions relating to the previously noted advantages of minimizing air entrapment, and providing accurate filling charges with either continuous or interrupted filling operations.

Thus, as best shown in FIG. 3, each filling valve 22 is secured to an external pad 66 on the supply tank 42, and includes the valve block 61, and the cylinder block 63, mounted on projecting stud bolts 72, with intervening gaskets, not shown, to provide a fluid tight seal at the interfaces.

A port 74 extends diagonally downward from the lower inside corner of the supply tank 42. An aligned port 75 is provided in the valve block 61, the port 75 being aligned with a lower port 76 in the valve block. A diagonal port 78 (FIG. 4) extends through the cylinder block 63 and is aligned with the lower valve block port 76. The paired ports 74, 75 and the paired ports 76, 78 are periodically interconnected by a diagonal bore or port 80 in the valve plunger 60, and the valve plunger can be positioned so that all of these diagonal ports 74, 75, 76, 78 and 80 cooperatively form the linear, inclined passage indicated generally at 64.

Again referring to FIGS. 3 and 4, the valve plunger 60 is reciprocable in a vertical bore 82 in the valve block 68, said bore intersecting the ports 75 and 76 and terminating in a depending nozzle 84 that is part of the valve block. For reciprocating the valve plunger 60, the upper end thereof is secured to a slide block 86 which carries a cam follower roller 88 that is engaged with the valve plunger cam 50 (FIGS. 1, 5 and 6). The details of the parts illustrated in FIG. 3 between the slide block 86 and the follower roller 88 are not critical to the present invention, and are part of a no-can, no-fill device disclosed in the copending patent application of David W. Cayton, Ser. No. 351,417, filed on Apr. 16, 1973, and having the same assignee as the present application. For the purpose of the present disclosure, the follower roller 88 may be directly anchored to the slide block 86 in order for the valve plunger cam 50 to operate the valve plunger 60.

For guiding the slide block 86, and to maintain the rotative position of the valve plunger port 80, the slide block has two recessed sides 90 which, in the assembled valve, slidably engage two upstanding guide bars 92. The bars 92 are integral with the cylinder block 63, which has a mounting pad 96 for receiving the stud bolts 72. The mounting pad 96 (FIG. 4) includes the port 78, which communicates with a cylindrical bore or measuring chamber 100. The volume of the measuring chamber varies in accord with the axial position of the measuring piston 62 (FIG. 3) as controlled by the measuring piston cam 52 (FIG. 1). A follower roller 102 is connected to the measuring piston 62 by a shaft 104 that operates in a guide slot 106 of the cylinder block 62 to maintain the roller in radial alignment with the turret.

A pivotable cover plate 108 (FIGS. 3 and 4) provides a cap for the lower end of the measuring chamber 100 to permit quick access to the interior when the valve is disassembled for cleaning. A vertically apertured boss 110 is mounted on the cylinder block 63 for a cam-lock 112 which is manually operated to move the cover plate 108 between the positions shown in FIGS. 3 and 4. For this purpose, the cover plate 108 is mounted on a swing arm 114 that is carried by a pivot shaft 116 extending upward through the boss 110. A pin 118 pivotally connects an L-shaped handle 120 to the shaft 116, and the pin is eccentric relative to a camming surface 122. By raising and swinging the handle 120 to the position shown in FIG. 3, the cover plate 108 can be positioned clear of the bottom of the cylinder block 63, and the piston 62 can be raised out of the housing at a point where the upper section of the cam 52 (FIG. 1) is either open or hinged for this purpose, as is a known construction in prior art rotary filling machines. This allows rapid access for cleaning, and the cover plate is readily sealed to the measuring chamber 100 (FIG. 4) by swinging the cover plate under the measuring chamber and depressing the handle 120 so that the camming surface 122 raises the cover plate and seals a deformable gasket 124 to the end surface of the measuring chamber.

The valve plunger cam 50 (FIG. 1) is similarly open, or capable of being opened, at one location around the turret to permit the valve plunger 60 to be raised out of the valve block 61 when the valve is dismantled for cleaning. Further, the slide block 86 (FIG. 5) is easily uncoupled from the valve plunger without tools. To permit this uncoupling and yet keep the slide block 86 and the valve plunger 60 in rotative alignment so that the valve port 80 will accurately align with the associated valve block port 76, the slide block 86 (FIG. 5A) is provided with a laterally open slot 126 having parallel side walls to prevent the rotation of a generally D-shaped head 128 on the upper end of the valve plunger 60. By relative lateral sliding movement, the head 128 and the slide block 86 can be quickly coupled to uncoupled.

FIGS. 5 and 6 respectively illustrate the filling valve 22 in two different conditions, one for charging the measuring chamber 100 from the supply tank 42 (FIG. 5), and one for delivering the charge from the measuring chamber to a can C (FIG. 6). In the first instance, the salient feature is that the valve passage 64, collectively formed by the ports or passages 74, 75, 76, 78 and 80, is linear and leads diagonally downward from the supply tank 42 to the bottom of the measuring chamber 100. This not only provides the most direct passage for transferring the product into the measuring chamber, but also provides an efficient means of escape for any air bubbles which may develop during operating of the filling valve because the bubbles tend to rise through the passage 64 and have an unobstructed path back to the supply tank.

In the case of the operational position shown in FIG. 6, it is important to note that the port 80 in the valve plunger 60 entraps and is completely filled with product P when the valve plunger 60 is raised to open the nozzle 84. In the condition illustrated, the measuring piston 62 is descending to force the product from the measuring chamber, up through diagonal ports 78, 76, and out of the nozzle 84. When the valve plunger 60 returns to the FIG. 5 position, the product in the valve port 80 reestablishes a fluid link between product at each side of the valve plunger and prevents the influx of air, and provides means for allowing any entrained air bubbles to rise into the tank 42.

Sequential operating positions for one filling valve 22 are described in connection with FIGS. 2, and 7–18, beginning with FIG. 7 wherein the measuring chamber 100 is CHARGING. The timing of the filling valves is such that the cans C become tangent with the turret T at zero degrees. The filled cans are discharged at about 270° but the valves and measuring chambers progress counterclockwise for 360° during one complete filling cycle. Radial degree lines on FIG. 2 are marked to show the successive locations of the filling valve illustrated in FIGS. 7–17. FIG. 7 depicts the valve condition at about 339°, approaching the zero degree position where an empty can C will be placed under the valve and the valve will meter out one can-filling charge in the next 180°. The angular measurement given are merely exemplary of a particular filling machine, and are not intended to in any way limit the disclosed invention.

Both the measuring piston 62 (FIG. 7) and the valve plunger 60 are rising, with the valve passage 64 open between the supply tank 42 and the measuring chamber 100. However, the measuring piston 62 is moving much slower than the valve plunger, because the piston is very near the top of its stroke and the passage 64 must be closed at the time the piston stops. Meanwhile, the rising piston inducts the product P from the supply tank 42, through the passge 64, into the measuring chamber 100.

At about 348° (FIG. 8) the valve passage 64 is nearly half closed by the valve plunger 60 with the piston 62 still slowly rising.

At about 354° (FIG. 9), both the plunger and piston are continuing to rise but the passage 64 is nearly closed by the valve plunger 60. Charging is almost complete.

At 3° (FIG. 10), the piston 62 is stopped, the measuring chamber 100 is FULLY CHARGED and the passage 64 is closed by the valve plunger 60. However, the valve plunger 60 is still rising rapidly and has closed off the ports 74, 75 from the tank, but is about to open the lower ports 76, 78 to the nozzle 84. An empty can C has been positioned under the nozzle 84.

At 12° (FIG. 11), the piston 62 begins to slowly descend to pump the product through the nozzle for FILLING the can beneath the nozzle. The valve plunger 60 at this time has opened the ports 76, 78 thereby connecting the measuring chamber 100 to the nozzle 84 but the valve plunger is still rising.

At 21° (FIG. 12), the valve plunger 60 is STOPPED, but the piston 62 continues to descend to discharge the product from the measuring chamber 100 into the can. This product discharge continues, and at 175 degrees (FIG. 13), substantially all of the intended charge has been displaced out of the measuring chamber for flow into the can. The valve plunger 60 is now being lowered for eventual closing of the lower ports 76, 78 of the valve passage 64.

At the END OF FILL STROKE, 180° (FIG. 14), the upper and lower ports of the passage 64 are closed off from each other, the piston 62 has reached the end of its fill stroke and is stationary, and the nozzle 84 is blocked off from the passage 64 by the valve plunger 60. The can has now been completely filled.

It should be noted in FIG. 14 that the valve plunger port 80, which was filled with entrapped product before the can was filled (FIGS. 9 and 10) still retains that trapped product. When the valve plunger descends below the position shown in FIG. 15 (about 186.4°) to a lower position such as that shown in FIG. 16 (about 191.6°), the entrapped fluid in the valve plunger bore 80 reestablishes a liquid column between the product in the measuring chamber 100 and that in the supply tank 42.

The measuring piston 62 remains stationary between the end of the fill stroke at 180° (FIG. 14) and 186.4° where the piston RESUMES DESCENT (FIG. 15) but during this time the valve plunger 60 continues its descent for re-opening the fluid passage 64, as described above. When the piston 62 resumes its descent after 186.4 degrees (FIG. 15) and as the valve plunger 60 continues its descent (FIG. 16) as described, the passage 64 is opened between the measuring cylinder and the supply tank for the LIQUID RETURN MOTION. When the measuring piston 62 resumes its descent as described, the piston partakes of a liquid return motion below its former lowermost fill stroke position that occurred during the filling cycle, and some of the product remaining in the bottom of the measuring chamber 100 is pumped back toward the supply tank 42 (FIG. 16). It will be recalled that the valve plunger port 80 was filled with product before the valve plunger closed off the tank port (FIGS. 9 and 10). As a result, when the plunger port 80 reestablishes communication between the measuring cylinder and the tank, between the operational positions shown in FIGS. 15 to 17, air bubbles within the product in the measuring cylinder and the ports are vented to the supply tank 42. This venting takes place during about 10 degrees of angular movement of the filling valve 22 as it progresses around the turret T, between the positions of FIGS. 15 and 17. The position labelled END OF DESCENT, FIG. 17 (196.4°) marks the end of the liquid return descent motion of the piston 62.

After the FIG. 17 position, the valve plunger 60 descends to its fully lowered position (FIG. 18) wiping the interior of the nozzle 84 clean. However, the measuring piston 62 begins to rise after the FIG. 17 position for inducting the next measured charge of product plus the amount returned to the tank after the end of the fill stroke, for filling the next incoming empty can, which will index with that filling valve at the zero degree position shown on FIG. 2.

The valve plunger 60 remains in its lowermost position of FIG. 18 from the 200.15° (not shown) to the 334.5° position (not shown). The measuring piston 62, to effect CHARGING, continues rising as shown in FIG. 18 up to the 355.14° position (not shown) which is substantially at the high point of the piston cam 52 at the 360° position. This very slight overtravel of the piston insures a full charge and the piston starts down at the 4.86° position (not shown) which is just after the 3° position of FIG. 10. The valve plunger cam 50 and the piston cam 52 are cut to produce the aforesaid critical points of operation and are smoothly faired between those points in accordance with filling machine practice.

Returning now to FIG. 4, the important no-spill feature of the present invention is shown for those valves in which the nozzles are open for filling but the filling machine is stopped in mid-cycle. It will be recalled (FIGS. 11–13) that during discharge of the product from the nozzle 84, the lower ports 76 and 78 adjacent the measuring chamber 100 are kept full due to the pumping action of the piston 62, after which the valve plunger 60 closes those ports as the measuring piston 62 (FIG. 14) reaches the end of its fill stroke, during which the container is filled. However, if the operation of the filling machine is interrupted, and the valve plunger 60 and the measuring piston 62 are stopped in the positions such as those shown in FIGS. 11–13, for example, a condition results such as that shown in FIG. 4. That portion of the product above the surface level L, namely the product in the valve plunger bore 82 and that in the upper portion of the ports 76, 78 above the intersection 132 of the port 76 with the bore 82 will flow by gravity into the can. This is immaterial, because even in a normal filling operation these bodies of liquid would have been pumped or flowed into the can. An important aspect of the filling valve 22, is that the passage defined by the ports 76 and 78 between the filling nozzle 84 and the measuring chamber 100, is so arranged that the upper lip or margin at 130 of the port 76 at its intersection with the measuring chamber 100 lies below the lower lip 132 of the port 76 and hence the lip 130 is below the product level L in the diagonal port 78. By this means, the lower portions of the port 76, 78 and the measuring chamber comprise a U-tube which functions in a manner similar to a closed U-tube manometer, in that atmospheric pressure acting on the surface L of the product in the lower portion of the diagonal ports 76, 78 supports the column of product in the measuring chamber, and substantially no product escapes the open nozzle 84. Although the surface L of the product in the ports 76 and 78 is exposed to atmospheric pressure with the filling valve in the FIG. 4 position, atmospheric pressure is sealed from the top of the short column of liquid product in the measuring chamber 100 by the piston 62, and the resulting pressure differential prevents the product in the measuring chamber from displacing the product in the diagonal ports 76, 78 and spilling from the nozzle.

Because the product which did gravitate from the diagonal ports and the measuring chamber through the nozzle would have been part of the normal, can-filling charge, when the filling machine is restarted and the normal sequence of operations such as those shown in FIGS. 11–14 is resumed, the can disposed beneath the previously interrupted filling valve under description receives the balance of its normal charge, and during this process the void left by the product which gravitationally drained from the upper portion of the diagonal ports 74, 76 is immediately filled by the action of the descending measuring piston 62 to refill the ports 76 and 78 before the valve plunger 60 closes them off from the nozzle 84, as in FIG. 14.

As mentioned, after the can in question has been filled, the valve plunger port 80 reestablishes communication between the supply tank 42 and the measuring chamber 100 (as shown in FIG. 16) so that any trapped air bubbles will rise into the supply tank, and the measuring piston descends to pump the excess product back into the supply tank which further assists in purging the liquid of any entrained air. It is thus virtually impossible to entrain air within a filling valve 22, even if the filling machine stops in mid-cycle, and the self-purging action described in connection with FIGS. 15–17 always follows an open valve condition and will eliminate the bubbles from the measuring system before the next empty can is filled. It is believed evident from the preceding description that the filling valves will provide accurate filling of every container whether or not the filling cycle is interrupted, and does not waste any product since the usual overfill and underfill conditions prevalent in conventional filling valves have been eliminated In summary of the structural provisions which either produce or make possible the noted improved results, the valve plunger 60 and the measuring piston 62 are side by side above the open end of the can C, and lie substantially on a radial line R (FIG. 2) of the turret T. In this way, the diagonal ports 74, 75, 76, 78 and 80 (FIG. 4) when aligned or partially aligned form the passage 64, and the passage extends upwardly from the bottom of the measuring chamber 100 to the lower inside corner of the supply tank 42. The upwardly inclined, substantially linear passge 64 facilitates purging air from the filling valve, and the positioning of the valve plunger 60 between the supply tank 42 and the measuring chamber 100 allows the reciprocable valve plunger to entrap a slug of product and prevents the influx of air that could otherwise impair the filling accuracy and the substantially instantaneous recovery to fill accuracy after a mid-cycle stop.

Although the best mode contemplated for carrying out the present invention has been herein shown and described, it will be apparent that modification and variation may be made without departing from what is regarded to be the subject matter of the invention.

What is claimed is:

1. In a container filling machine of the type having a rotatable supply tank mounting a measuring cylinder and piston assembly and a valve assembly including a valve plunger and a valve casing providing a filling nozzle; ports interconnecting said valve assembly, said supply tank and said measuring cylinder, means for raising said piston to charge the measuring cylinder with product from said supply tank, and means for lowering the piston to pump the product charge through the open valve into a container beneath the nozzle, the improvement comprising:
   a. said valve casing having an upright bore forming a nozzle open to atmosphere at its lower end;
   b. said measuring cylinder having an upright bore with a closed bottom disposed alongside said valve casing; and
   c. cooperative ports in said measuring cylinder and said valve casing forming a fluid conducting port descending diagonally from said valve casing bore into said measuring cylinder bore;
   d. the lowermost intersection of said port with the bore of said valve casing being above the uppermost intersection of said port with the bore of said measuring cylinder so that the lower portion of said port and said measuring chamber bore form a U-tube, atmospheric pressure acting on the liquid in said port supporting the column of liquid in the measuring chamber for preventing gravitational draining of said U-tube through the nozzle end of the valve casing when said valve plunger has opened said port and liquid has drained from the upper portion of said port.

2. The filling machine of claim 1 wherein said valve casing and said measuring cylinder are side by side on a substantially radial line extending from the turning axis of said supply tank, said valve casing being positioned intermediate said supply tank and said measuring cylinder.

3. In a container filling machine of the type having a rotating reservoir, a measuring cylinder and piston assembly and a valve casing and valve plunger assembly, said assemblies being mounted side by side externally of said reservoir, a filling nozzle depending from said valve casing, a port connecting said reservoir to said valve casing and a port connecting said valve casing to said measuring cylinder, a port in said valve plunger for interconnecting said reservoir and measuring cylinder ports with the valve lowered, raising of the plunger valve sealing off the reservoir port while opening the measuring cylinder port to the valve casing below the lower end of the valve plunger; the improvement wherein said measuring cylinder is mounted on said valve casing along a radial line from substantially the center of said reservoir and passing through the valve plunger, said valve plunger port being a straight bore extending diagonally down from the reservoir and toward the measuring cylinder.

4. The filling machine of claim 3, wherein said valve casing is a separate block-like member, and means for removably securing said valve casing to said reservoir and said measuring cylinder to said valve casing.

5. The filling machine of claim 4, wherein said valve plunger projects up past said valve block-like valve casing member, a grooved guide block secured to the upper end portion of said valve plunger, and a fixed guide bar mounted on said cylinder and slidably fitting said guide block groove to prevent rotation of said valve plunger.

6. Apparatus according to claim 3, wherein said ports cooperatively form a linear passage extending upwardly from the lower end of said measuring cylinder through said valve plunger and into said reservoir when said filling nozzle is closed by said valve plunger after said measuring piston has descended to fill a container, and means for moving said piston further downward after said filling nozzle is closed to return a surplus charge of product from said measuring cylinder upward through said linear passage to said reservoir in order to remove any entrained air bubbles.

7. Apparatus according to claim 6 and a removable bottom end cap on said measuring cylinder, and manually operable means mounting said end cap for movement between a position in sealing engagement with the bottom end of said measuring cylinder and a position opening said bottom end for free interior access.

8. Apparatus according to claim 7 and a guide block removably and non-rotatably attached to the upper end of said valve plunger, said guide block having opposed guide tracks, and a pair of fixed guide bars extending upwardly from said measuring cylinder for relative sliding engagement with said guide block tracks to maintain a predetermined orientation for the diagonal bore of said plunger valve.

9. In a rotary filling machine including a supply tank rotatable about an upright axis, a plurality of plunger type filling valves externally secured to said tank, and measuring piston and cylinder assemblies each associated with a filling valve for inducting a measured charge of product from the supply tank and discharging the charge through a filling valve nozzle into a container carried under the valve; the improvement wherein each filling valve and the associated measuring cylinder are side by side on a substantially radial line extending substantially from the turning axis of said supply tank, said filling valve being positioned intermediate said supply tank and said measuring cylinder; the supply tank, the plunger of said filling valve, and said measuring cylinder each having diagonal ports cooperatively arranged to provide a diagonal passage when the filling valve nozzle is closed by the valve plunger; said passage extending diagonally upwardly from the bottom end of said measuring cylinder through said valve plunger port and to said supply tank to provide an escape path from said measuring cylinder to said supply tank for entrained air bubbles in the product; the lower portion of said diagonal port associated with said measuring cylinder and said measuring cylinder forming, when said filling valve plunger has opened the nozzle and has closed relative said supply tank port, a U-tube with said lower portion of the diagonal measuring cylinder port open to atmosphere to support the column of liquid in said measuring cylinder and to inhibit drainage of the product from said port and said measuring chamber.

* * * * *

UNITED STATES PATENT OFFICE
CERTIFICATE OF CORRECTION

Patent No. 3,850,345  Dated November 26, 1974

Inventor(s) Robert D. Merritt

It is certified that error appears in the above-identified patent and that said Letters Patent are hereby corrected as shown below:

Col. 5, line 64, change "62" to -- 63 --.

Col. 6, line 39, change "to" to -- or --.

Col. 6, line 54, change "erateng" to -- eration --.

Signed and Sealed this twenty-seventh Day of January 1976

[SEAL]

Attest:

RUTH C. MASON
Attesting Officer

C. MARSHALL DANN
Commissioner of Patents and Trademarks